(12) United States Patent
Nakamura et al.

(10) Patent No.: US 11,859,763 B2
(45) Date of Patent: Jan. 2, 2024

(54) CONTAINER, LUBRICANT FEEDER, GREASE GUN, AND CONNECTING MEMBER

(71) Applicant: Nabtesco Corporation, Tokyo (JP)

(72) Inventors: Koji Nakamura, Tokyo (JP); Hiroyuki Miyoshi, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 494 days.

(21) Appl. No.: 17/028,697

(22) Filed: Sep. 22, 2020

(65) Prior Publication Data
US 2021/0095816 A1 Apr. 1, 2021

(30) Foreign Application Priority Data

Sep. 27, 2019 (JP) ................................ 2019-177787

(51) Int. Cl.
*F16N 3/12* (2006.01)
*F16N 3/08* (2006.01)
*F16N 19/00* (2006.01)

(52) U.S. Cl.
CPC ................. *F16N 3/12* (2013.01); *F16N 3/08* (2013.01); *F16N 19/00* (2013.01); *F16N 2200/12* (2013.01)

(58) Field of Classification Search
CPC ... F16N 3/12; F16N 3/08; F16N 19/00; F16N 2200/12
USPC .......................................................... 222/95
See application file for complete search history.

(56) References Cited

U.S. PATENT DOCUMENTS

| | | | | |
|---|---|---|---|---|
| 1,325,573 A | * | 12/1919 | Nelson | F16N 3/12 222/388 |
| 1,387,473 A | * | 8/1921 | Craven | F16N 3/12 222/390 |
| 1,551,760 A | * | 9/1925 | Lunt | F16N 3/12 222/256 |
| 1,555,711 A | * | 9/1925 | Hershinger | F16N 37/02 222/327 |
| 1,642,770 A | * | 9/1927 | Drake | F16N 37/02 222/326 |
| 1,677,603 A | * | 7/1928 | Steen | F16N 37/02 401/153 |
| 1,926,398 A | * | 9/1933 | Nielsen | F16N 3/12 222/525 |
| 1,961,707 A | * | 6/1934 | Parker | F16N 21/04 222/340 |

(Continued)

FOREIGN PATENT DOCUMENTS

| | | |
|---|---|---|
| CN | 2204367 Y | 8/1995 |
| CN | 102788238 A | 11/2012 |

(Continued)

OTHER PUBLICATIONS

Extended European Search Report dated Feb. 15, 2021, issued in corresponding European Patent Application No. 20197001.9 (16 pgs.).

(Continued)

*Primary Examiner* — Paul R Durand
*Assistant Examiner* — Michael J. Melaragno
(74) *Attorney, Agent, or Firm* — Pillsbury Winthrop Shaw Pittman, LLP

(57) ABSTRACT

A container includes a pouch formed of a film material and in which a lubricant composition with a worked penetration of 300 to 450 is filled and sealed, and a spout fixed to the pouch.

5 Claims, 7 Drawing Sheets

(56) References Cited

U.S. PATENT DOCUMENTS

| | | | | |
|---|---|---|---|---|
| 2,318,928 | A | * | 5/1943 | Deighton ............... F16N 37/02 222/325 |
| 2,520,372 | A | * | 8/1950 | Phillips .................. F16L 33/01 285/353 |
| 2,562,755 | A | * | 7/1951 | Walker ..................... F16N 3/08 222/324 |
| 2,635,787 | A | * | 4/1953 | Bryant ...................... F16N 3/12 222/326 |
| 2,671,579 | A | * | 3/1954 | Knoblock ............. B65D 35/10 222/542 |
| 3,065,898 | A | * | 11/1962 | Daugherty ............ B65D 35/02 383/120 |
| 3,246,802 | A | * | 4/1966 | Fuhrmann ................ F16N 3/12 222/496 |
| 3,285,473 | A | * | 11/1966 | Ernst ........................ F16N 3/12 222/509 |
| 3,288,334 | A | * | 11/1966 | Corsette ............ B05B 11/00412 222/321.9 |
| 3,389,833 | A | * | 6/1968 | Ramis ................... B65D 83/62 222/95 |
| 4,093,170 | A | * | 6/1978 | Spray ................... F16M 11/041 248/688 |
| 5,044,471 | A | * | 9/1991 | Machek .................... F16N 3/12 222/326 |
| 5,286,516 | A | * | 2/1994 | Uken ....................... H01R 4/70 427/117 |
| 2004/0084482 | A1 | * | 5/2004 | Sumner ..................... F16N 3/00 222/387 |
| 2005/0006413 | A1 | * | 1/2005 | Miyata .............. B65D 83/0005 222/391 |
| 2005/0230429 | A1 | * | 10/2005 | Weems ..................... F16N 3/12 222/383.1 |
| 2006/0091159 | A1 | * | 5/2006 | Shew ...................... F16N 11/08 222/256 |
| 2006/0210409 | A1 | * | 9/2006 | Sumner .............. F04C 15/0073 417/440 |
| 2006/0278660 | A1 | * | 12/2006 | Zhang ....................... F16N 9/04 222/333 |
| 2007/0137942 | A1 | * | 6/2007 | Weems ..................... F16N 5/02 184/105.2 |
| 2010/0181327 | A1 | * | 7/2010 | Kanda ................. B65D 1/0292 220/601 |
| 2010/0206901 | A1 | * | 8/2010 | Alguera Gallego ........................ B05C 17/00583 222/326 |
| 2012/0241479 | A1 | * | 9/2012 | Kuo .......................... F16N 3/12 222/256 |
| 2013/0233886 | A1 | * | 9/2013 | Long ..................... B65D 35/30 222/491 |
| 2013/0327790 | A1 | * | 12/2013 | Ryan ......................... F16N 5/00 222/105 |
| 2014/0080744 | A1 | * | 3/2014 | Fujinami ............ C10M 171/008 508/552 |
| 2014/0121144 | A1 | * | 5/2014 | Fujinami .............. C10M 115/08 508/481 |
| 2014/0124533 | A1 | * | 5/2014 | Melia ................ B05C 17/00583 222/105 |
| 2015/0252283 | A1 | * | 9/2015 | Sekiguchi ............ C10M 169/04 508/179 |
| 2016/0002558 | A1 | * | 1/2016 | Takane ................. C10M 115/08 508/552 |
| 2016/0076698 | A1 | * | 3/2016 | Maser ....................... F16N 3/12 222/326 |
| 2017/0088318 | A1 | | 3/2017 | Franca et al. |
| 2017/0183603 | A1 | * | 6/2017 | Imai .................... C10M 169/044 |
| 2018/0079988 | A1 | * | 3/2018 | Inoue ................... C10M 169/06 |
| 2020/0078820 | A1 | * | 3/2020 | Lusso ..................... F16N 37/02 |
| 2020/0191329 | A1 | * | 6/2020 | Lusso ................. F16K 15/1823 |
| 2021/0095816 | A1 | * | 4/2021 | Nakamura ......... B65D 83/0072 |

FOREIGN PATENT DOCUMENTS

| | | | |
|---|---|---|---|
| CN | 203395551 U | 1/2014 | |
| JP | S51-157791 U | 12/1976 | |
| JP | 04-054398 A | 2/1992 | |
| JP | 05-263989 A | 10/1993 | |
| JP | H08-1022 U | 6/1996 | |
| JP | 2006-336664 A | 12/2006 | |
| JP | 4689515 B2 | 5/2011 | |
| JP | 2017-032103 A | 2/2017 | |
| JP | 2018-529589 A | 10/2018 | |
| JP | 2019-094474 A | 6/2019 | |
| KR | 10-2008-0072598 A | 8/2008 | |
| WO | WO-2018030090 A1 * | 2/2018 | .......... C10M 101/02 |
| WO | WO-2019049963 A1 * | 3/2019 | |
| WO | WO-2020240622 A1 * | 12/2020 | |

OTHER PUBLICATIONS

Notice of Reasons for Rejection dated May 9, 2023, issued in corresponding Japanese Patent Application No. 2019-177787 with English translation (9 pgs.).

* cited by examiner

CONTAINER, LUBRICANT FEEDER, GREASE GUN, AND CONNECTING MEMBER

CROSS-REFERENCE TO RELATED APPLICATIONS

This application is based on and claims the benefit of priority from Japanese Patent Application Serial No. 2019-177787 (filed on Sep. 27, 2019), the contents of which are hereby incorporated by reference in its entirety.

TECHNICAL FIELD

The disclosure relates to a container, a lubricant feeder, a grease gun, a connecting member.

BACKGROUND

A speed reducer includes a plurality of sliding parts and rolling parts thereinside and reduces the rotation speed so that a torque applied to its input is increased and transmitted to its output side. Such speed reducers are widely used in transportation fields such as railways, aviation, and ships, as well as in industrial fields such as robots. One of requirements with which the performance of the speed reducer can be evaluate is that an output torque should be constant for a long period and should not fluctuate. In particular, for a speed reducer attached to a joint of a robot, it is required to enable precise movements of the joint.

However, distortion or deformation of internal parts of a speed reducer after operated, for example, damages of metal contact parts such as steel due to their sliding movements becomes noticeable especially at high temperature, and the life of the reducer is shortened at high temperature. Further, with the expansion of operating environments of speed reducers, it is required that speed reducers are operable in cold regions. In the cold regions or cold environment, the input torque (starting torque) increases at low temperatures such as winter, and a starting efficiency of a speed reducer decreases.

Use of lubricating oil or grease has been proposed to reduce the input torque of a reducer at low temperatures and to improve the durability of the reducer at high temperatures. In order to apply grease to a speed reducer, a grease gun filled with grease may be used to inject the grease into the reducer as described in Japanese Patent Application Publication No. 2006-336664. Further, a bellows type (accordion type) container for refill is known as described in Japanese Patent Application Publication No. 2017-032103 ("the '103 Publication"). When applying a small amount of grease, a resin bellows-type container may be used, and a dedicated gun may be used for injection of grease into the speed reducer.

However, the workability is low with the filling type grease gun and the grease may remain in the gun. It is desired to improve the low efficiency. Further, the refill container described in the '103 Publication has a drawback that grease tends to leak from its lid portion although it contains a small amount of grease. Furthermore, when grease is stored in the bellows-type container for long periods, it is required to form the bellows-like (accordion-like) portion of the container with a layer capable of preventing ingredients of the grease from seeping, which results in high cost.

SUMMARY

One object of the present invention is to provide a grease gun lubricant feeder and container that has a simple and inexpensive design but can prevent seeping of grease therefrom and to provide a feature that facilitates replacement of grease in a speed reducer with the feeder and container.

According to one aspect of the invention, provided is a container that includes a pouch formed of a film material and in which a lubricant composition with a worked penetration of 300 to 450 is filled and sealed, and a spout fixed to the pouch.

According to the aspect of the invention, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. The container according to the aspect of the invention can store the lubricant composition for a long period of time (enables long-term storage). The container according to the aspect is accommodated in a cylindrical member of a grease gun so that the container can be easily connected to the speed reducer without transferring the grease to another container. In this way, the number of work steps can be reduced and the work time can be shortened, and the work of injecting the grease into the speed reducer and replacing the grease can be performed easily and inexpensively.

According to another aspect of the invention, provided is a container that includes a pouch formed of a film material and in which a lubricant composition is filled and sealed, and a spout fixed to the pouch. The lubricant composition includes base oil with a kinematic viscosity of 20 to 150 $mm^2/s$ measured at 40° C.

According to this aspect of the invention, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. The container according to the aspect of the invention can store the lubricant composition for a long period of time (enables long-term storage). The container according to the aspect is accommodated in a cylindrical member of a grease gun so that the container can be easily connected to the speed reducer without transferring the grease to another container. In this way, the number of work steps can be reduced and the work time can be shortened, and the work of injecting the grease into the speed reducer and replacing the grease can be performed easily and inexpensively.

According to yet another aspect of the invention, provided is a container that includes a pouch formed of a film material and in which a lubricant composition is filled and sealed, and a spout fixed to the pouch. The proportion of base oil in the lubricant composition is 50 to 99% by weight.

According to the aspect of the invention, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. The container according to the aspect of the invention can store the lubricant composition for a long period of time (enables long-term storage). The container according to the aspect is accommodated in a cylindrical member of a grease gun so that the container can be easily connected to the speed reducer without transferring the grease to another container. In this way, the number of work steps can be reduced and the work time can be shortened, and the work of injecting the grease into the speed reducer and replacing the grease can be performed easily and inexpensively.

According to still yet another aspect of the invention, provided is a container that includes a pouch formed of a film material and a spout attached and fixed to the pouch. A lubricant composition that has a worked penetration of 300 to 450 and includes base oil with a kinematic viscosity of 20 to 150 mm$^2$/s measured at 40° C. is filled and sealed in the pouch, and the proportion of the base oil in the lubricant composition is 50 to 99% by weight.

According to this aspect of the invention, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. The container according to the aspect of the invention can store the lubricant composition for a long period of time (enables long-term storage). The container according to the aspect is accommodated in a cylindrical member of a grease gun so that the container can be easily connected to the speed reducer without transferring the grease to another container. In this way, the number of work steps can be reduced and the work time can be shortened, and the work of injecting the grease into the speed reducer and replacing the grease can be performed easily and inexpensively.

According to another aspect of the invention, provided is a lubricant feeder that includes a lubricant composition with a worked penetration of 300 to 450, a pouch formed of a film material and in which the lubricant composition is filled and sealed, and a spout fixed to the pouch.

With the lubricant feeder according to the aspect of the invention, it is possible to improve the product life of a speed reducer at high temperatures and prevent an increase in input torque at low temperatures. Further, with the lubricant feeder according to the aspect, it is possible to prevent seeping of the lubricant composition (grease) that can increase the starting efficiency of the speed reducer, and it is possible to divide the lubricant composition into small packages. The lubricant feeder according to the aspect of the invention can store the lubricant composition for a long period of time (enables long-term storage). The lubricant feeder according to the aspect can be easily connected to the speed reducer without transferring the grease to another container. In this way, the number of work steps can be reduced and the work time can be shortened, and the work of injecting the grease into the speed reducer and replacing the grease can be performed easily and inexpensively.

According to yet another aspect of the invention, provided is a lubricant feeder that includes a pouch formed of a film material and in which a lubricant composition is filled and sealed, and a spout fixed to the pouch. The lubricant composition includes base oil with a kinematic viscosity of 20 to 150 mm$^2$/s measured at 40° C.

With the lubricant feeder according to the aspect of the invention, it is possible to improve the product life of a speed reducer at high temperatures and prevent an increase in input torque at low temperatures. Further, with the lubricant feeder according to the aspect, it is possible to prevent seeping of the lubricant composition that can increase the starting efficiency of the speed reducer, and it is possible to divide the lubricant composition into small packages. The lubricant feeder according to the aspect of the invention can store the lubricant composition for a long period of time (enables long-term storage). The lubricant feeder according to the aspect can be easily connected to the speed reducer without transferring the grease to another container. In this way, the number of work steps can be reduced and the work time can be shortened, and the work of injecting the grease into the speed reducer and replacing the grease can be performed easily and inexpensively.

According to still yet another aspect of the invention, provided is a lubricant feeder that includes a lubricant composition including base oil in a proportion of 50 to 99% by weight, a pouch formed of a film material and in which the lubricant composition is filled and sealed, and a spout fixed to the pouch.

With the lubricant feeder according to the aspect of the invention, it is possible to improve the product life of a speed reducer at high temperatures and prevent an increase in input torque at low temperatures. Further, with the lubricant feeder according to the aspect, it is possible to prevent seeping of the lubricant composition that can increase the starting efficiency of the speed reducer, and it is possible to divide the lubricant composition into small packages. The lubricant feeder according to the aspect of the invention can store the lubricant composition for a long period of time (enables long-term storage). The lubricant feeder according to the aspect can be easily connected to the speed reducer without transferring the grease to another container. In this way, the number of work steps can be reduced and the work time can be shortened, and the work of injecting the grease into the speed reducer and replacing the grease can be performed easily and inexpensively.

According to another aspect of the invention, provided is a lubricant feeder that includes a lubricant composition having a worked penetration of 300 to 450 and including base oil with a kinematic viscosity of 20 to 150 mm$^2$/s at 40° C. The proportion of the base oil in the lubricant composition is 50 to 99% by weight. The lubricant feeder further includes a pouch formed of a film material and in which the lubricant composition is filled and sealed, and a spout attached and fixed to the pouch.

With the lubricant feeder according to the aspect of the invention, it is possible to improve the product life of a speed reducer at high temperatures and prevent an increase in input torque at low temperatures. Further, with the lubricant feeder according to the aspect, it is possible to prevent seeping of the lubricant composition that can increase the starting efficiency of the speed reducer, and it is possible to divide the lubricant composition into small packages. The lubricant feeder according to the aspect of the invention can store the lubricant composition for a long period of time (enables long-term storage). The lubricant feeder according to the aspect can be easily connected to the speed reducer without transferring the grease to another container. In this way, the number of work steps can be reduced and the work time can be shortened, and the work of injecting the grease into the speed reducer and replacing the grease can be performed easily and inexpensively.

According to yet another aspect of the invention, provided is a grease gun. The grease gun includes a cylindrical member accommodating a container that includes a pouch formed of a film material and a spout fixed to the pouch, a push member pressing the container in the cylindrical member to push out a lubricant composition, and a connecting member connected to the spout and having a through-hole through which the lubricant composition passes. The lubricant composition with a worked penetration of 300 to 450 is filled and sealed in the pouch.

With the grease gun according to the aspect of the invention, it is possible to improve the product life of a speed reducer at high temperatures and prevent an increase in input torque at low temperatures. Further, with the grease gun according to the aspect, it is possible to prevent seeping of the lubricant composition that can increase the starting efficiency of the speed reducer, and it is possible to divide the lubricant composition into small packages. Therefore, by using the container (pouch container) that can easily and inexpensively store the lubricant composition (grease) for a long period of time, the grease gun according to the aspect is able to easily perform injection of the grease into the speed reducer. When the grease filled in the speed reducer is replaced, the grease gun can be easily connected to the speed reducer without transferring the grease to another container. Consequently it is possible to prevent leakage of the lubricant composition (grease) from the connecting member. As discussed above, with the grease gun according to the aspect, the process of the connecting work and the injection work can be simplified, and the work time of replacing the grease in the speed reducer can be reduced.

According to still yet another aspect of the invention, provided is a grease gun. The grease gun includes a cylindrical member accommodating a container that includes a pouch formed of a film material and a spout fixed to the pouch. A lubricant composition that includes base oil with a kinematic viscosity of 20 to 150 mm$^2$/s at 40° C. is filled and sealed in the pouch. The grease gun further includes a push member pressing the container in the cylindrical member to push out the lubricant composition, and a connecting member connected to the spout and having a through-hole through which the lubricant composition passes.

With the grease gun according to the aspect of the invention, it is possible to improve the product life of a speed reducer at high temperatures and prevent an increase in input torque at low temperatures. Further, with the grease gun according to the aspect, it is possible to prevent seeping of the lubricant composition that can increase the starting efficiency of the speed reducer, and it is possible to divide the lubricant composition into small packages. Therefore, by using the container (pouch container) that can easily and inexpensively store the lubricant composition for a long period of time, the grease gun according to the aspect is able to easily perform injection of the grease into the speed reducer. When the grease filled in the speed reducer is replaced, the grease gun can be easily connected to the speed reducer without transferring the grease to another container. Consequently it is possible to prevent leakage of the lubricant composition (grease) from the connecting member. As discussed above, with the grease gun according to the aspect, the process of the connecting work and the injection work can be simplified, and the work time of replacing the grease in the speed reducer can be reduced.

According to another aspect of the invention, provided is a grease gun. The grease gun includes a cylindrical member accommodating a container that includes a pouch formed of a film material and a spout fixed to the pouch. A lubricant composition is filled and sealed in the pouch, and the proportion of base oil in the lubricant composition is 50 to 99% by weight. The grease gun further includes a push member pressing the container in the cylindrical member to push out the lubricant composition, and a connecting member connected to the spout of the container and having a through-hole through which the lubricant composition passes.

With the grease gun according to the aspect of the invention, it is possible to improve the product life of a speed reducer at high temperatures and prevent an increase in input torque at low temperatures. Further, with the grease gun according to the aspect, it is possible to prevent seeping of the lubricant composition that can increase the starting efficiency of the speed reducer, and it is possible to divide the lubricant composition into small packages. Therefore, by using the container (pouch container) that can easily and inexpensively store the lubricant composition for a long period of time, the grease gun according to the aspect is able to easily perform injection of the grease into the speed reducer. When the grease filled in the speed reducer is replaced, the grease gun can be easily connected to the speed reducer without transferring the grease to another container. Consequently it is possible to prevent leakage of the lubricant composition (grease) from the connecting member. As discussed above, with the grease gun according to the aspect, the process of the connecting work and the injection work can be simplified, and the work time of replacing the grease in the speed reducer can be reduced.

According to yet another aspect of the invention, provided is a grease gun. The grease gun includes a cylindrical member accommodating a container that includes a pouch formed of a film material and a spout fixed to the pouch. A lubricant composition that has a worked penetration of 300 to 450 and includes base oil with a kinematic viscosity of 20 to 150 mm$^2$/s measured at 40° C. is filled and sealed in the pouch, and the proportion of the base oil in the lubricant composition is 50 to 99% by weight. The grease gun further includes a push member pressing the container in the cylindrical member to push out the lubricant composition, and a connecting member connected to the spout of the container and having a through-hole through which the lubricant composition passes.

With the grease gun according to the aspect of the invention, it is possible to improve the product life of a speed reducer at high temperatures and prevent an increase in input torque at low temperatures. Further, with the grease gun according to the aspect, it is possible to prevent seeping of the lubricant composition that can increase the starting efficiency of the speed reducer, and it is possible to divide the lubricant composition into small packages. Therefore, by using the container (pouch container) that can easily and inexpensively store the lubricant composition for a long period of time, the grease gun according to the aspect is able to easily perform injection of the grease into the speed reducer. When the grease filled in the speed reducer is replaced, the grease gun can be easily connected to the speed reducer without transferring the grease to another container. Consequently it is possible to prevent leakage of the lubricant composition (grease) from the connecting member. As discussed above, with the grease gun according to the aspect, the process of the connecting work and the injection work can be simplified, and the work time of replacing the grease in the speed reducer can be reduced.

According to still yet another aspect of the invention, provided is a grease gun. The grease gun includes a cylindrical member accommodating a container that includes a pouch formed of a film material and in which a lubricant composition is filled and sealed and a spout fixed to the pouch, a push member pressing the container in the cylindrical member to push out the lubricant composition; and a connecting member having a through-hole through which the lubricant composition passes from the container to a subject to which the lubricant composition is supplied, and threaded portions formed at ends of the through-hole. One of the threaded portions is coupled with the spout, and the other of the threaded portions is coupled with a connecting tube connected to the subject to which the lubricant composition is supplied.

With the grease gun according to the aspect of the invention, it is possible to improve the product life of a speed reducer at high temperatures and prevent an increase in input torque at low temperatures. Further, with the grease gun according to the aspect, it is possible to prevent seeping of the lubricant composition that can increase the starting efficiency of the speed reducer, and it is possible to divide the lubricant composition into small packages. Further, the container (pouch container) used in the grease gun according to the aspect of the invention can easily and inexpensively store the lubricant composition for a long period of time. The container (pouch container) can be connected to the connecting member, and a connecting tube can be connected to the connecting member to easily inject the lubricant into the speed reducer. When the grease filled in the speed reducer is replaced, the grease gun can be easily connected to the speed reducer without transferring the grease to another container. With the grease gun according to the aspect, it is possible to prevent leakage of the lubricant composition (grease) from the connecting member and to simplify the steps of the connecting work and the injection work, and the work time of replacing the grease by injecting the grease in the speed reducer can be inexpensively performed.

In the grease gun according to the above aspect, the flow rate of the lubricant composition pushed out may be 1 to 7 $cm^3/s$.

In the grease gun according to the above aspect, the flow rate of the lubricant composition pushed out may be 1 to 7 $cm^3/s$.

In the grease gun according to the above aspect, a connecting tube connected to the grease gun may have an inner diameter of 2.5 to 20 mm and a length of 1000 mm or less.

According to another aspect of the invention, provided is a connecting member that includes a through-hole formed therein, and a threaded portion formed at one end of the through-hole and coupled with a spout of a container. The container includes a pouch formed of a film material and in which a lubricant composition is filled and sealed and the spout fixed to the pouch. The connecting member further includes a threaded portion formed at the other end of the through-hole and coupled with a connecting tube connected a subject to which the lubricant composition is supplied. The connecting member is detachable from a cylindrical member of a grease gun.

With the connecting member according to the aspect, the threaded portion is coupled with the spout of the pouch container, and the other threaded portion is coupled with the connecting tube connected with the speed reducer to which the lubricant composition is supplied. In this state, the connecting member and the pouch container are housed in the cylindrical member of the grease gun, and the connecting tube is projected from the tip of the grease gun. The connecting tube is connected to the speed reducer, and the push member of the grease gun presses the pouch container in the cylindrical member. In this way, the lubricant composition is pushed out to replace the grease in the speed reducer. The container (pouch container) used for the connecting member according to the aspect can improve the product life of the speed reducer at high temperatures and prevent an increase in input torque at low temperatures. Further, with the container (pouch container) according to the aspect, it is possible to prevent seeping of the lubricant composition that can increase the starting efficiency of the speed reducer, and it is possible to divide the lubricant composition into small packages. Therefore with the container, it is possible to store the lubricant composition easily and inexpensively for a long term. Moreover, by using the container (pouch container), the connecting member according to the aspect of the invention, and the connecting tube, it is possible to easily inject the lubricant composition into the speed reducer. When the grease filled in the speed reducer is replaced, the grease gun can be easily connected to the speed reducer without transferring the grease to another container. With the connecting member according to the aspect, it is possible to prevent leakage of the lubricant composition (grease) from the connecting member and to simplify the steps of the connecting work and the injection work, and the work time of replacing the grease by injecting the grease in the speed reducer can be inexpensively performed.

The container according to the aspect includes a tubular or bag-like storage member formed of a film material and in which a lubricant composition with a worked penetration of 300 to 450 is filled and sealed.

With the container according to the aspect, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. Therefore, with the container according to the aspect, the storage member that facilitates long-term storage of the lubricant composition is accommodated in the cylindrical member of the grease gun, and the grease gun can be easily connected to the reducer without transferring the grease. In this way, the number of work steps can be reduced and the work time can be shortened, and the work of injecting the grease into the speed reducer and replacing the grease can be performed easily and inexpensively.

The container according to the aspect includes a tubular or bag-like storage member formed of a film material and in which a lubricant composition with a worked penetration of 300 to 450 is filled and sealed, and a spout fixed to the bag-like storage member.

With the container according to the aspect, it is possible to improve the product life of a speed reducer at high temperatures and prevent an increase in input torque at low temperatures. Further, with the container according to the aspect, it is possible to prevent seeping of the lubricant composition that can increase the starting efficiency of the speed reducer, and it is possible to divide the lubricant composition into small packages. Therefore, with the container according to the aspect, the storage member that facilitates long-term storage of the lubricant composition is accommodated in the cylindrical member of the grease gun, and the grease gun can be easily connected to the reducer using the spout without transferring the grease. In this way, the number of work steps can be reduced and the work time can be shortened, and the work of injecting the grease into the speed reducer and replacing the grease can be performed easily and inexpensively.

According to the aspects of the invention, it is possible to prevent seeping of grease and to provide a feature that facilitates replacement of grease in a speed reducer with a simple and inexpensive grease gun and pouch container.

DESCRIPTION OF THE EMBODIMENTS

Figure 1:
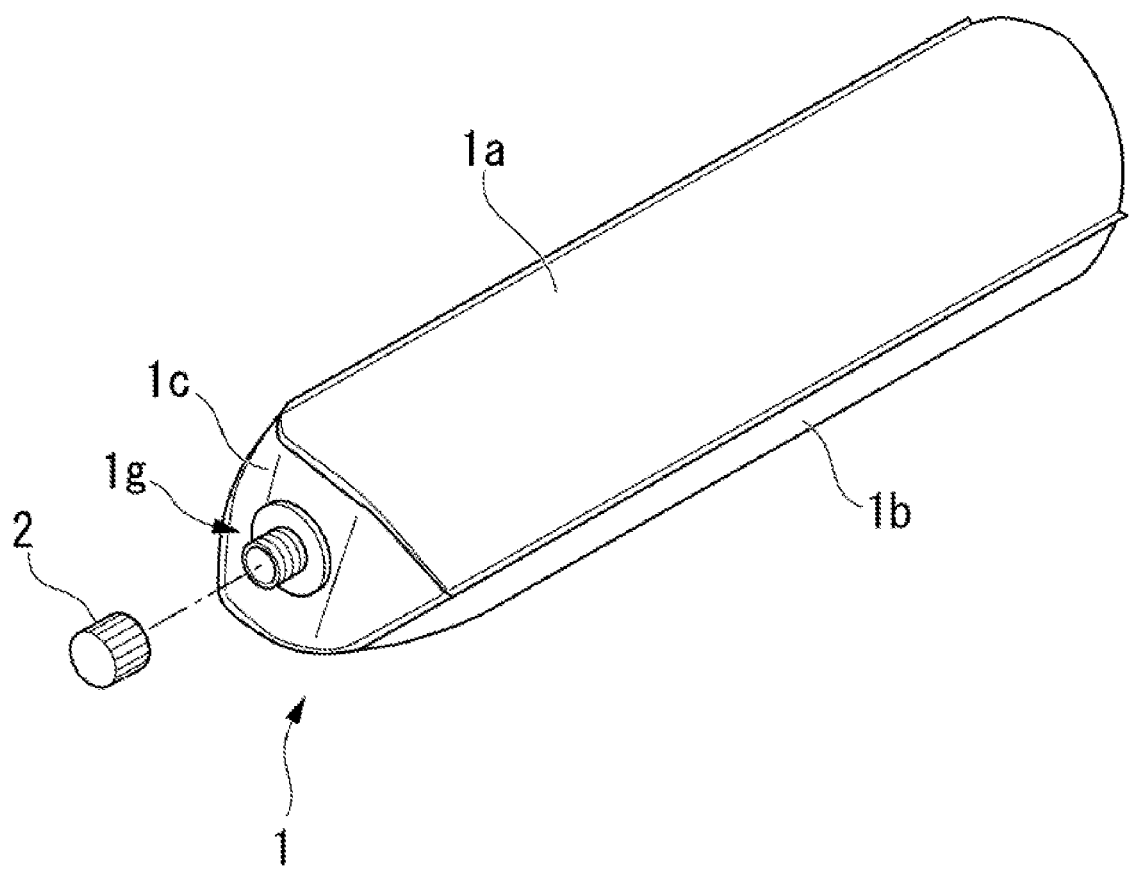
FIG. 1 is a perspective view of a pouch container according to an embodiment of the invention.

The following describes a pouch container, a grease gun, and a connecting member according to an embodiment of the invention with reference to the accompanying drawings.

The pouch container (container) according to the embodiment is filled with a lubricant composition (grease) injected into, for example, an eccentric oscillating-type planetary gear reducer. The lubricant composition (grease) according to the embodiment is defined as follows.

1. A lubricant composition for an eccentric oscillating-type planetary gear reducer includes the following components (a) to (c):
(a) a base oil containing a synthetic oil,
(b) hydrocarbon wax, and
(c) a calcium salt of at least one type selected from the group consisting of calcium salt of petroleum sulfonic acid, calcium salt of alkylaromatic sulfonic acid, calcium salt of oxidized wax, overbased calcium salt of petroleum sulfonic acid, overbased calcium salt of alkylaromatic sulfonic acid, and overbased calcium salt of oxidized wax.
2. The lubricant composition for a reducer described in the above item 1, wherein the hydrocarbon wax (b) is at least one selected from the group consisting of a polyethylene wax and a polypropylene wax.
3. The lubricant composition for a reducer described in the above item 1 or 2, wherein the hydrocarbon wax (b) is contained in an amount of 0.1 to 20 mass % of the total mass of the composition.
4. The lubricant composition for a reducer described in any one of the above items 1 to 3, wherein the synthetic oil in the base oil (a) is a synthetic hydrocarbon oil.
5. The lubricant composition for a reducer described in any one of the above items 1 to 4, wherein the base oil (a) has a kinematic viscosity of 20 to 300 mm$^2$/s at 40° C.
6. The lubricant composition for a reducer described in any one of the above items 1 to 5, wherein the calcium salt (c) includes the calcium salt of alkyl aromatic sulfonic acid and the overbasic calcium salt of alkyl aromatic sulfonic acid.

The base oil (a) used in the embodiments includes a synthetic oil as an essential component. However another base oil component such as a mineral oil may also be contained in the base oil. Any synthetic oils generally used in conventional lubricant compositions, for example, a synthetic hydrocarbon oil, an ester oil, phenyl ether, polyglycol and the like are usable as the synthetic oil. One kind of synthetic oil may be used alone, or two or more kinds of synthetic oils may be used in combination. Among others, a synthetic hydrocarbon oil is preferably used as the synthetic oil. Specifically, one or more types of α-olefins that are mixed and polymerized can be used as the synthetic hydrocarbon oil.

Examples of the α-olefin include α-olefins produced using ingredients such as ethylene, propylene, butene, and the derivatives thereof. Preferably, α-olefins having 6 to 18 carbon atoms (e.g., 1-decene, 1-dodecene and the like) can be used. Most preferably, poly α-olefin (PAO), which is an oligomer of 1-decene or 1-dodecene, is used as the synthetic hydrocarbon oil.

The base oil may preferably contains a synthetic hydrocarbon oil (for example, PAO), and more preferably, a combination of the synthetic hydrocarbon oil (for example, PAO) and a mineral oil may be used as the base oil. The proportion of the synthetic oil (for example, the synthetic hydrocarbon oil such as PAO) in the base oil may preferably be in the range of 10 to 100%, and more preferably 10 to 50 mass % (for example, 10 to 20 mass %). When the proportion of the synthetic oil is lower than 10 mass %, the input torque may increase at low temperatures.

The proportion of the base oil in the lubricant composition is preferably 50 to 99 mass %, more preferably 70 to 95 mass %.

The base oil used in the embodiment may have a kinematic viscosity at 40° C. of 20 to 300 mm$^2$/s, preferably 30 to 220 mm$^2$/s (for example, 40 to 200 mm$^2$/s), and more preferably 50 to 150 mm$^2$/s (for example, 60 to 100 mm$^2$/s). When the kinematic viscosity of the base oil is lower than 20 mm$^2$/s, the product life may be short under high temperatures. Whereas when the kinematic viscosity is higher than 300 mm$^2$/s, some failure may occur at low temperatures at the start of the operation. Note that the kinematic viscosity of the base oil at 40° C. is determined in accordance with Japanese Industrial Standards JIS K 2283.

<Hydrocarbon Wax>

The hydrocarbon wax (b) used in the embodiment is not particularly limited, but may comprise at least one chemical compound selected from the group consisting of polyolefin wax (such as a polyethylene wax, an oxidized polyethylene wax, a polypropylene wax, an ethylene-propylene copolymer wax and the like), montan wax, and amide wax.

In particular, the polyolefin wax is preferred among the above specific examples. The weight-average molecular weight of the polyolefin wax is not particularly limited but may be in the range of about 1,000 to 20,000. The melting viscosity of the polyolefin wax is not particularly limited but may be in the range of 25,000 to 30,000 mPa-s at 140° C., or in the range of 9,000 to 10,000 mPa-s at 170° C.

The density of the polyolefin wax is not particularly limited either. Any of a high-density polyolefin wax (with a density of 0.96 g/cm$^3$ or more, for example), a medium-density polyolefin wax (with a density of ranging from 0.94 to 0.95 g/cm$^3$, for example) and a low-density polyolefin wax (with a density of 0.93 g/cm$^3$ or less, for example) can be used. The high-density polyolefin wax is characterized by high melting point, high softening point, high crystallinity, and high degree of hardness; while the low-density polyolefin wax is characterized by low melting point, low softening point, and soft. In terms of heat resistance, the polyolefin wax preferably has a dropping point of 100° C. or higher, more preferably 110° C. or higher. In terms of solubility in the base oil, the dropping point of the polyolefin wax is preferably 150° C. or lower, more preferably 135° C. or lower.

The acid value of the polyolefin wax is preferably in the range of 0 to 10 mgKOH/g, and more preferably 0 to 5 mgKOH/g. When the acid value is within the above-mentioned range, oxidative deterioration of the lubricant composition by acid components can be reduced. Among various polyolefin waxes, at least one selected from the group consisting of polyethylene wax, polypropylene wax, and ethylene-propylene copolymer wax is preferable, and at least one selected from the group consisting of polyethylene wax and polypropylene wax is more preferable.

Specific examples of commercially available polyethylene wax include Licowax PE520, Licowax PE190 and Licowax PE130 manufactured by Clariant Japan K.K.; and specific examples of commercially available polypropylene wax include Licosen PP 7502, Licosen PP 3602 and Ceridust 6050M manufactured by Clariant Japan K.K., and Hi-WAX NP105 and Hi-WAX NP500 manufactured by Mitsui Chemicals, Inc.

The most preferable hydrocarbon wax is polypropylene wax. The proportion of the hydrocarbon wax in the lubricant composition may be in the range of 0.1 to 20 mass %, preferably 0.1 to 10 mass %, more preferably 0.5 to 7 mass %, and most preferably 1 to 5 mass %.

<Calcium Salt>

The calcium salt (c) used in the embodiment is at least one selected from the group consisting of calcium salt of petroleum sulfonic acid, calcium salt of alkylaromatic sulfonic acid, calcium salt of oxidized wax, overbased calcium salt of petroleum sulfonic acid, overbased calcium salt of alkylaromatic sulfonic acid, and overbased calcium salt of oxidized wax.

The term "overbasic calcium salt of X" herein means a calcium salt of X having a base number of 200 mgKOH/g or more when determined in accordance with JIS K 2501. When simply expressed as "calcium salt of X," the calcium salt of X does not indicate an overbasic salt, but a neutral or basic calcium salt, that is, a calcium salt of X having a basic number of less than 200 mgKOH/g determined in accordance with JIS K 2501.

Particularly, at least one selected from the group consisting of calcium salt of alkyl aromatic sulfonic acid and overbasic calcium salt of alkyl aromatic sulfonic acid is preferably used as the calcium salt. It is more preferable to a combination of calcium salt of alkyl aromatic sulfonic acid and overbasic calcium salt of alkyl aromatic sulfonic acid. In the above-mentioned combination, the proportion of the overbasic calcium salt of alkyl aromatic sulfonic acid may be in the range of 50 to 99 mass %, preferably 60 to 90 mass %, and more preferably 65 to 80 mass %. Usage of the combination can further improve the durability at high temperatures.

The proportion of the calcium salt in the lubricant composition may preferably be 0.1 to 20 mass %, more preferably 0.5 to 10 mass % (for example, 1 to 5 mass %). When the proportion of the calcium salt in the lubricant composition is less than 0.1 mass %, the product life may be short under high temperatures. Whereas when the proportion of the calcium salt is more than 20 mass %, the effect commensurate with the added amount cannot be obtained.

<Thickener>

The lubricant composition in the embodiment may further includes a thickener (d). Any kind of thickener can be used. For example, soap-based thickeners such as lithium soaps and lithium complex soaps, urea-based thickeners such as diurea, inorganic thickeners such as organoclay and silica, organic thickeners such as PTFE, and the like are usable as the thickener. In particular, the lithium soap type thickeners and the urea type thickeners are preferable, and the former is more preferred.

The proportion of the thickener in the lubricant composition is preferably 0 to 20 mass % (for example, 1 to 15 mass %), and more preferably 0.5 to 10 mass % (for example, 0.5 to 3 mass %). When the proportion of the thickener in the lubricant composition is less than 0.5 mass %, a sufficient thickening effect cannot be obtained. Whereas when the proportion of the thickener exceeds 20 mass %, the resultant lubricant composition may become too hard to penetrate into a portion to be lubricated, resulting in insufficient lubrication. When the lubricant composition includes a thickener, the worked penetration of the composition is preferably in the range of 300 to 450 (for example, 350 to 410), and more preferably 395 to 425. The worked penetration herein used means a cone penetration measured immediately after the plunger of a given test apparatus is stroked 60 times while the sample is maintained in the apparatus, as defined in JIS K 2220.

The lubricant composition of the embodiment may further includes other optional additives when necessary. The optional additives include a rust inhibitor or detergent-dispersant other than the calcium salt (c), an extreme pressure agent, an antioxidant, a metal corrosion inhibitor, an oiliness improver, an antiwear agent, a solid lubricant and the like. In particular, the extreme pressure agent (e) is preferably used.

<Extreme Pressure Agent>

The extreme pressure agent (e) that can be optionally used in the embodiment is not particularly limited. For example, at least one selected from the group consisting of thiophosphates and thiocarbamates can be used as the extreme pressure agent. The thiophosphates include dithiophosphates, such as a zinc salt or molybdenum salt of dithiophosphoric acid (for example, dialkyldithiophosphoric acid). The thiocarbamates include dithiocarbamates, such as a zinc salt or molybdenum salt of dithiocathamic acid (for example, dialkyldithiocarbamic acid).

The preferable extreme pressure agent is at least one selected from the group consisting of molybdenum dithiocarbamate and zinc dithiophosphate. Use of molybdenum dithiocarbamate (in particular, molybdenum dialkyldithiocarbatnate) in combination with zinc dithiophosphate (in particular, zinc dialkyldithiophosphate is more preferable. In the above-mentioned combination, the proportion of the molybdenum dithiocarbamate may preferably be 50 to 99 mass %, and more preferably 55 to 90 mass %.

The fraction of the extreme pressure agent in the lubricant composition may be 0 to 1.5 mass %, and more preferably 0.5 to 1 mass %. When the fraction of the extreme pressure agent in the lubricant composition exceeds 1.5 mass %, precipitation of the additive may cause vibration or other problems of the speed reducer more frequently.

As one preferable embodiment, provided is a lubricant composition that can be used for an eccentrically oscillating speed reducer of planetary gear type. The lubricant composition includes the following components (a) to (e):

(a) a base oil comprising a synthetic hydrocarbon oil;
(b) at least one selected from the group consisting of polyethylene wax and polypropylene wax;
(c) at least one calcium salt selected from the group consisting of a calcium salt of alkyl aromatic sulfonic acid and an overbasic calcium salt of alkyl aromatic sulfonic acid;
(d) a lithium-soap based thickener, and
(e) at least one selected from the group consisting of molybdenum dithiocarbamate and zinc dithiophosphate.

The lubricant composition of the invention can be used for an eccentrically oscillating speed reducer of planetary gear type. Especially, in light of the advantages of excellent durability under high temperatures and minimum variation of the output torque, the lubricant composition is preferably used for an eccentrically oscillating speed reducer of planetary gear type used in joints of robots.

One of the typical eccentrically oscillating speed reducers of planetary gear type has a first-stage speed reduction mechanism and a second-stage speed reduction mechanism. The first-stage speed reduction mechanism is designed to reduce the rotational speed of a motor and transmit the reduced speed to the second-stage speed reduction mechanism. The second-stage speed reduction mechanism includes an inner gear, an outer gear meshing with the inner gear, a crankshaft engaged with the outer gear to allow the outer gear to set up an eccentrically oscillating motion with respect to the inner gear, and a support which supports the crankshaft rotatably, with the output being taken out from the inner gear or the support.

A pouch container according to the embodiment will now be described with reference to the drawings.

Figure 2:
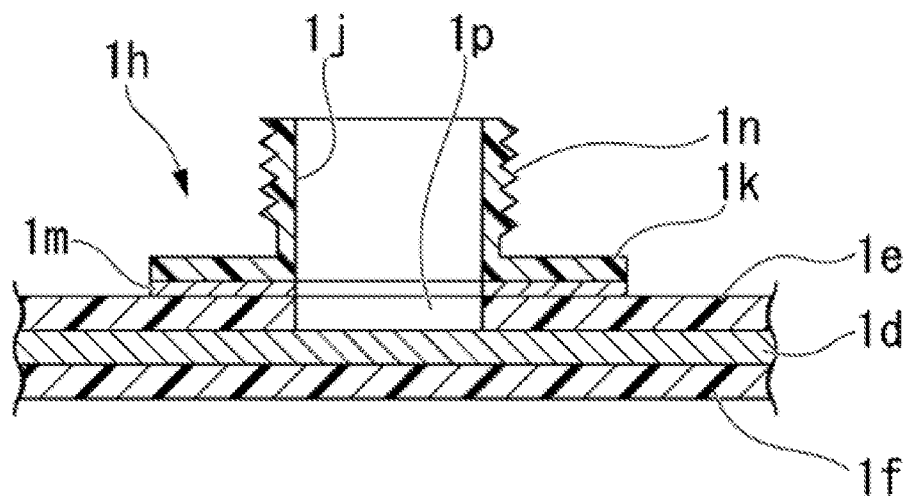
FIG. 2 is a schematic enlarged sectional view showing a region near an extrusion opening base portion of the pouch container according to the embodiment of the invention.

FIG. 1 is a perspective view of the pouch container according to the embodiment, and FIG. 2 is a schematic enlarged sectional view of a region near a spout base body of the pouch container according to the embodiment. The pouch container is indicated by reference numeral 1 in the drawings. The pouch container (container) 1 in the embodiment is filled with a lubricant composition (grease) injected into, for example, an eccentric oscillating-type planetary gear reducer. The pouch container (container) 1 according to the embodiment can be used as a lubricant feeder.

As shown in FIG. 1, the pouch container 1 in the embodiment has a ship bottom shape (boat shape). A film 1c having an irregular hexagon is arranged at one ends of two substantially rectangular films (film material) 1a and 1b, and the entire circumference of the film 1c is fused to the films 1a and 1b. Further, both side edges of the films 1a and 1b are fused to each other, and after filling the content, the other ends of the films 1a and 1b are fused to seal the container. In this way, the pouch container 1 in the embodiment is formed.

As shown in FIG. 2, in the embodiment, the films 1a, 1b and 1c forming the pouch (storage member) of the pouch container 1 have a gas barrier property. An aluminum foil 1d forming the pouch (storage member) of the pouch container 1 serves as a gas barrier layer and a water vapor barrier layer. A stretched polyamide resin layer 1e is laminated as a base film on one surface of the aluminum foil 1d, and a low density polyethylene film layer 1f or an unstretched polypropylene film layer is laminated on the other surface of the aluminum foil 1d. The stretched polyamide resin layer 1e, which is the base film, is fused such that it is situated on the outermost surface of the pouch container 1.

As shown in FIG. 1, the film 1c of the pouch container 1 becomes substantially flat when the pouch container 1 is filled with the content. The spout 1g is attached and fixed to a flat portion of the film 1c. As shown in FIG. 2, the spout 1g is formed of a spout base body 1h. The spout base body 1h includes a cylindrical portion 1j and a flange portion 1k formed on an end of the cylindrical portion 1j. The flange portion 1k is attached and fixed to the film 1c of the pouch container 1 with a hot melt layer 1m. A male thread in is formed on an outer peripheral surface of the cylindrical portion 1j of the spout base body 1h. A cap 2 may be provided for the spout 1g.

The cap 2 has a bottomed cylindrical body with an opening formed on its butt side, and a tip end of the cylindrical body is sealed when unused. The cap is opened when the content is pushed out as required. Further, on an inner peripheral surface of the butt portion of the cap 2, a female thread to be engaged with the male thread in is formed.

An open facilitating portion 1p may be formed in a portion of the film 1c of the pouch situated on the inner side of the spout base body 1h. The open facilitating portion 1p has a structure in which only the stretched polyamide resin layer 1e, which is the outermost base film of the pouch container 1, is omitted.

To make a hole in the pouch container 1, the tip of a suitable stick or the like is inserted inside the spout base body 1h from the opening of the cylindrical portion 1j to pierce the open facilitating portion 1p. At this time, since the stretched polyamide resin layer 1e, which is a high-strength base film, is not provided in the open facilitating portion 1p, it is possible to easily pierce and make a hole in the pouch even by using a stick with a round tip or the like.

Furthermore, features described below can also be adopted as necessary.

For example, (1) a structure in which a circular cut is made by a cutting blade in the stretched polyamide resin layer 1e which is the base film; (2) a large number of small pores are formed in the outermost stretched polyamide resin layer 1e which is also the base film; and/or (3) a structure in which an X-shaped cut is made in the entire film 1c, and the formed cut is covered with aluminum foil or paper.

Alternatively, the pouch container 1 may be composed of a single-layer film of a stretched polyamide resin or the like. In this case, a thinned portion may be formed in the single-layer film to provide the open facilitating portion. Further, the cut made by a cutting blade may have a X shape or the like instead of the circular shape as mentioned above. In the case where the pouch is formed of a single layer film, an X-shaped cut may be made therein and the cut may be covered with aluminum foil or paper.

In the case where the pouch container is made of a multi-layer film, the kinds of films to be laminated, the laminated structure and the like are not limited to the above described combination. For example, (1) a laminated structure without aluminum foil, (2) a laminated structure in which a polyamide resin layer is also disposed on the inner surface of the aluminum foil in addition to the above-mentioned laminated structure, and the like may also be adopted. As for the above-mentioned (1) laminated structure having no aluminum foil, a pierce facilitating portion (open facilitating portion) may be formed by forming notches or cuts only in the base film or forming a large number of small pores similarly to the above-mentioned laminated structure.

In addition, to form the open facilitating portion in the structure (2) in which the polyamide resin layer is also provided on the inner side of the aluminum foil, the outermost stretched polyamide resin layer 1e which is the base film, the aluminum foil 1d, and the aluminum foil may be omitted in the region where the open facilitating portion is provided. Besides, to form the open facilitating portion in the structure (2) in which the polyamide resin layer is also provided on the inner side of the aluminum foil, a notch is formed only in the outermost stretched polyamide resin layer 1e. Alternatively, in the structure (2) in which the polyamide resin layer is also provided on the inner side of the aluminum foil, the open facilitating portion may be formed by forming a notch or cut in the base film or by forming a large number of small pores similarly to the above-mentioned laminated structure. When adopting the open facilitating portion by a large number of small pores, the large number of small pores may be formed only in the outermost stretched polyamide resin layer 1e.

As the material for the base film, in addition to the stretched polyamide resin, known materials such as stretched polypropylene and polyethylene that are used for the same kind of pouch can be adopted.

In the above pouch container 1, the constituent films 1a, 1b and 1c have the same film structure, and the open facilitating portion 1p is formed at the portion of the film 1c to which the spout 1g is attached inside the spout 1g. The film 1c may have a structure where the film 1s more easily pierced than the films 1a and 1b.

Specifically, to form the above-described pouch, the first film 1a and the second film 1b are overlapped with each other, and the third film 1c is arranged at one end portions of the first film 1a. The entire circumference of the third film 1c is bonded or fused to the first film 1a or the second film 1b. Subsequently both side edges of the first film 1a and the second film 1b are bonded or fused to each other, and the other ends of the films 1a and 1b are bonded or fused after the pouch is filled with the content. In the pouch container 1 such as a pouch having a ship bottom shape (boat shape) formed in the above described way, when the spout 1g is attached to the third film 1c forming one end portion of the pouch container 1, the structure of the third film 1c may have the structure easier to be pierced as compared with the first and second films 1a and 1b.

For example, the first and second films 1a and 1b may be composed of a polyamide resin layer (15 μm; thickness, hereinafter the same))/aluminum foil (9 μm)/a polyamide resin layer (25 μm)/a low density polyethylene resin layer (70 μm) stated from the outer surface side of the pouch container 1 (outermost surface of the pouch container 1). The third film 1c may be composed of a polyamide resin layer (15 μm)/aluminum foil (9 μm)/a low density polyethylene layer (30 μm) stated from the outer surface side of the pouch container 1 (outermost surface of the pouch container 1).

In this way, the strength of the pouch container 1 is ensured since the strength of the first film 1a and the second film 1b forming the body of the pouch is enhanced. Whereas the third film 1c that forms the end portion of the pouch container 1 and to which the spout 1g is attached is configured such that it is easily pierced with a stick or the like.

The third film 1c has a lower strength than the first and second films 1a and 1b. However, when the third film 1c is inserted into an extruder and sealant or the like is pushed out from the container through the spout 1g as described above, the third film 1c contacts the inner end surface of the extruder and the pushing force is received by the inner end surface of the extruder. Therefore the third film 1c is not damaged during extrusion. The joint strength between the first film 1a and the second film 1b can be ensured by increasing the thickness of a sealant layer in the first and second films 1a and 1b.

The pouch container 1 in the embodiment may be formed in any shape as long as the content can be completely extruded therefrom using an extruder or the like. Specifically, as for the shape of the pouch container 1 according to the embodiment, a tubular pouch, a bag-like pouch, a ship bottom shaped pouch (boat shaped pouch) or a standing pouch is preferable in terms of handling and workability of the container.

A grease gun and a connecting member according to the embodiment will now be described with reference to the drawings.

Figure 3:
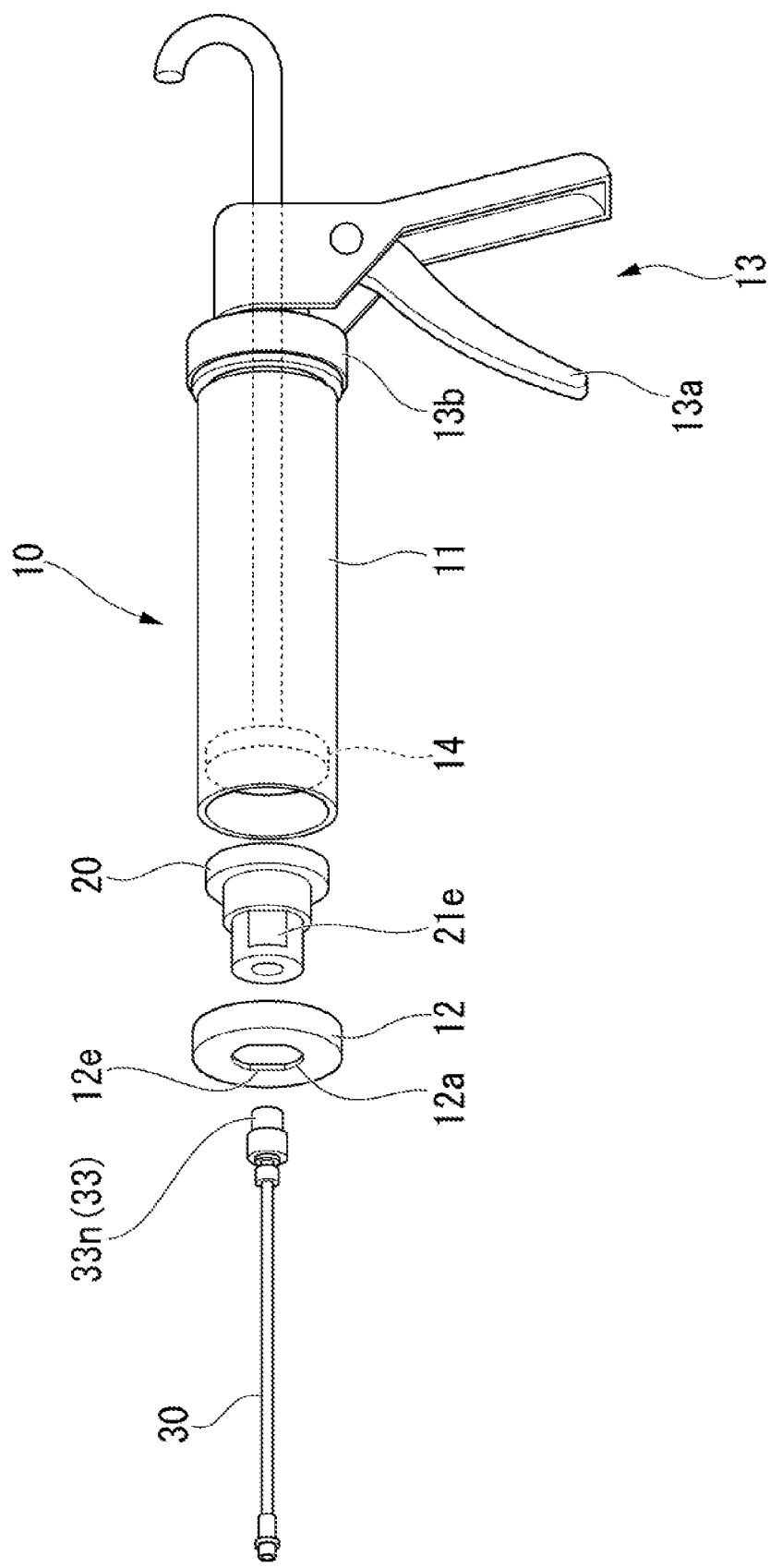
FIG. 3 is an exploded perspective view of a grease gun according to the embodiment of the invention.
Figure 4:
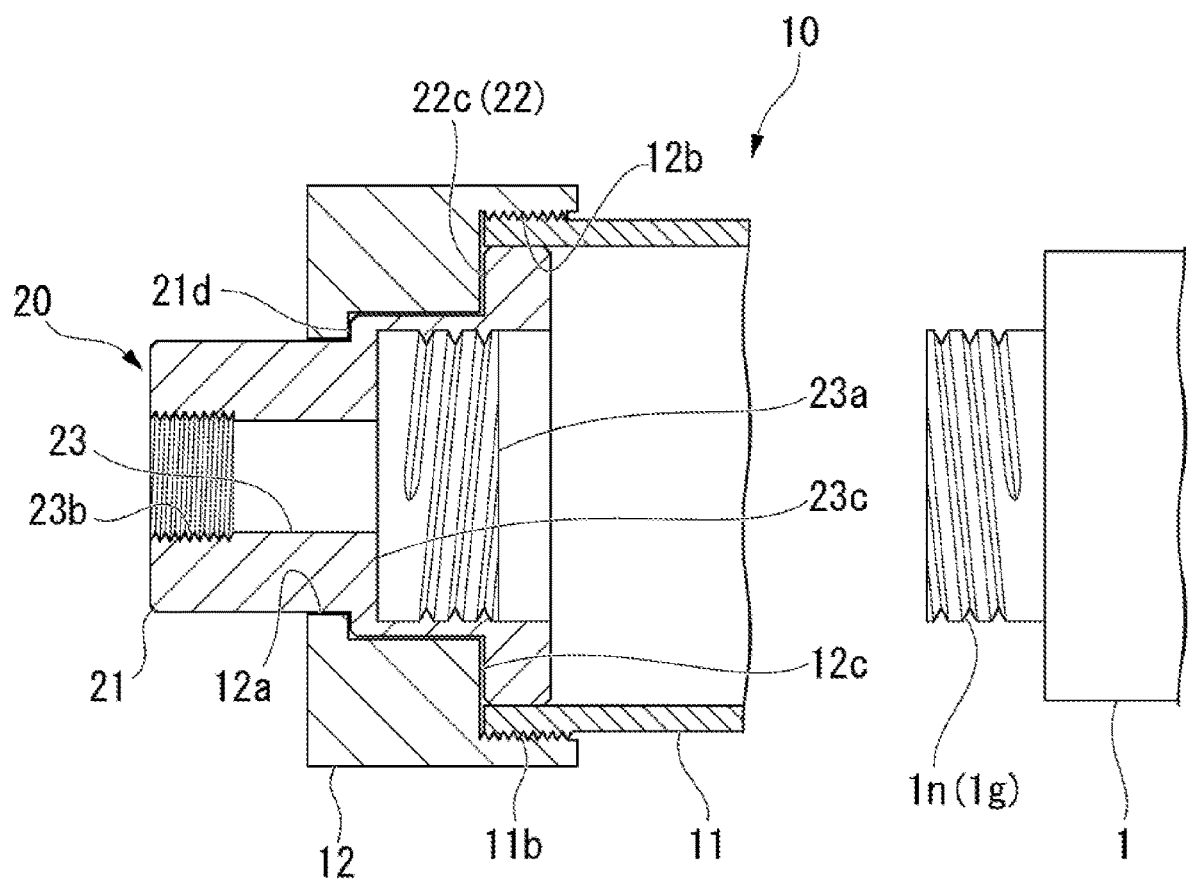
FIG. 4 is a schematic enlarged sectional view of a tip portion of the grease gun according to the embodiment.

FIG. 3 is an exploded perspective view of a grease gun according to the embodiment. FIG. 4 is a schematic enlarged sectional view of a tip portion of the grease gun according to the embodiment. In the drawings, the grease gun is indicated by reference numeral 10. The grease gun 10 in the embodiment serves as a lubricant feeder, and is used, when injecting the lubricant composition (grease) into, for example, an eccentric oscillating-type planetary gear reducer.

As shown in FIG. 3, the grease gun 10 in the embodiment includes a cylinder (cylindrical member) 11 which is a main body of the grease gun and whose both ends are opened. The grease gun 10 in the embodiment further includes a lid 12 having a through hole 12a formed therein, a connecting member 20 that is to be attached to the spout 1g of the pouch container 1 inside the lid 12, and a piston 14 disposed slidably inside the cylinder 11, and a trigger mechanism (pusher) 13 that supports and moves the piston 14 relative to the cylinder 11.

The cylinder 11 has a substantially cylindrical shape and accommodates the pouch container 1 containing a lubricant composition (grease) therein. The piston 14 is able to push the pouch container 1 inside the cylinder 11, and a rod that is moved by a trigger mechanism (push member) 13 in the axial direction is connected to the piston. Alternatively, a guide movable relative to the rod of the piston 14 may be fitted to the piston 14. As shown in FIGS. 3 and 4, a threaded portion 12b is formed on the inner side of the lid 12 that contacts with an outer peripheral surface of the end portion of the cylinder 11, thereby the lid 12 can be fastened to the cylinder 11. A threaded portion 11b corresponding to the threaded portion 12b of the lid 12 is formed on the outer peripheral surface of the end portion of the cylinder 11.

The trigger mechanism (push member) 13 has a trigger 13a for moving the piston 14. The trigger mechanism (push member) 13 also serves as the support member 13b and closes the other end of the cylinder 11. The push member is manually operated with the trigger. Alternatively the push member may be operated hydraulically, electrically or pneumatically as long as it can press the pouch container 1.

Figure 5:
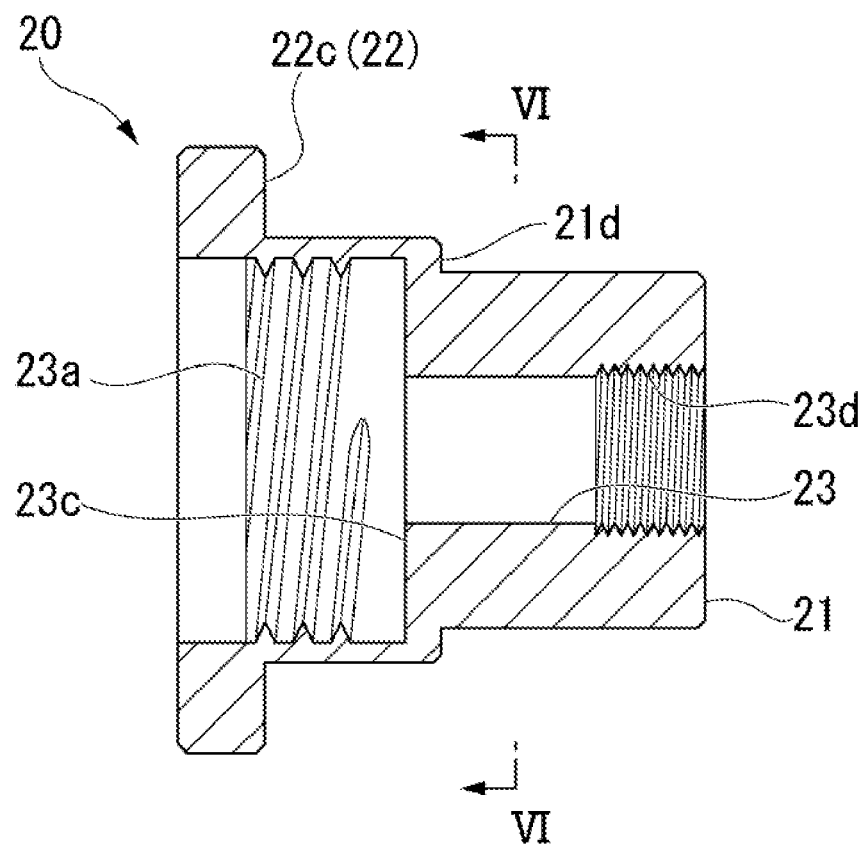
FIG. 5 is a sectional view of a connecting member according to the embodiment of the invention.
Figure 6:
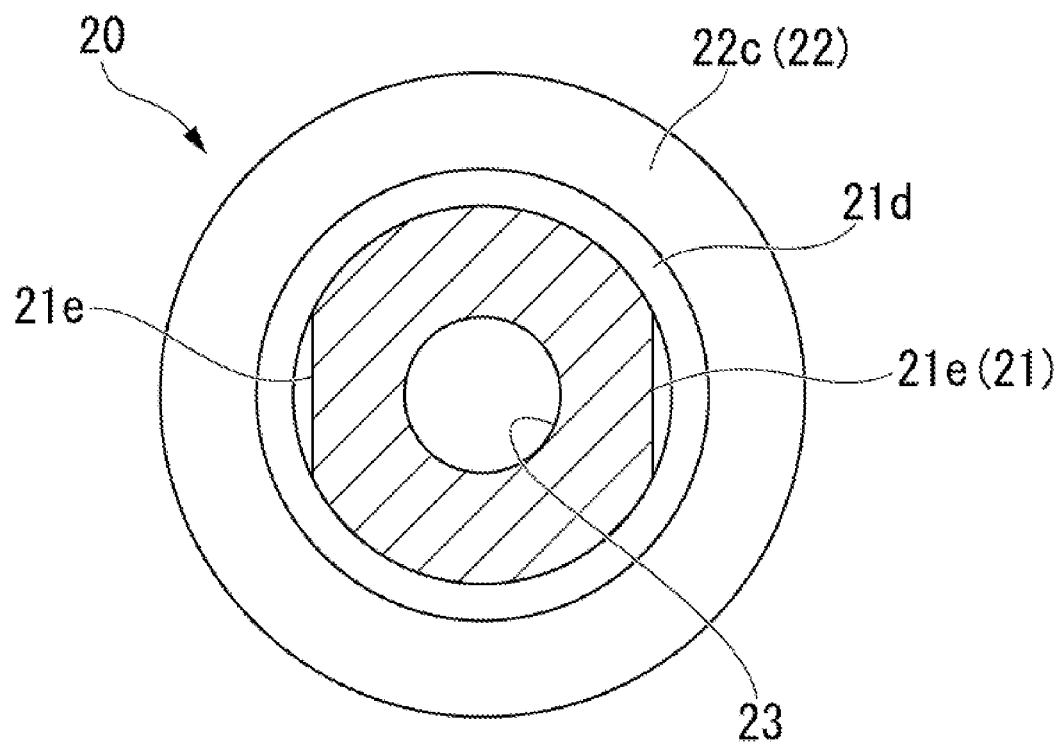
FIG. 6 is a cross-sectional view along the line VI-VI in FIG. 5.

FIG. 5 is a sectional view of a connecting member according to the embodiment. FIG. 6 is a cross-sectional view along the line VI-VI in FIG. 5. The connecting member 20 has a tip portion 21 inserted in the through hole 12a of the lid 12, and a flange portion 22 that is placed inside the lid 12 and abuts on a circumferential edge of the through hole 12a. The connecting member 20 is configured to be detachable from the cylinder 11. A through hole 23 is formed in the connecting member 20 along an axis line extending from a tip portion 21 to the flange portion 22. The through hole 23 is formed coaxially with the tip portion 21 and the flange portion 22.

The tip portion 21 is formed in a columnar shape. When the connecting member 20 is set in the cylinder 11, the tip portion 21 passes the through hole 12a of the lid 12 and partly projects from the lid 12. An end of the tip portion 21 opposite to the end protruding from the lid 12 is connected to the inside of the cylinder 11. The flange portion 22 is formed by enlarging the outer circumference of the end portion of the tip portion 21 connected to the inside of the cylinder 11. The outer diameter of the flange portion 22 is substantially the same as the inner diameter of the cylinder 11 or slightly smaller than the inner diameter of the cylinder 11.

The through hole 23 is a hole formed in the tip portion 21 and penetrates the tip portion in the direction from the end portion of the tip portion 21 protruding from the lid 12 (the end portion of the tip portion 21) toward the inside of the cylinder 11. The opening of the through hole 23 has a diameter that allows the cylindrical portion 1j of the spout 1g of the pouch container 1 to be inserted therethrough and attached. A threaded portion 23a is formed on the inner peripheral surface of the portion of the through hole 23 that opens toward the inside of the cylinder 11. The threaded portion 23a corresponds to the male thread in formed on the outer peripheral surface of the cylindrical portion 1j of the spout 1g of the pouch container 1. That is, the pitch, the nominal diameter, the root diameter, the effective diameter, the angle of the screw thread, etc. are set such that the threaded portion 23a and the male screw in are engaged to each other to seal the spout 1g and the through hole 23. It should be noted that FIG. 4 also shows the spout 1g so that the correspondence between the threaded portion 23a and the male screw in can be seen. Any fastening structures other than threads may be used.

The opening of the through hole 23 situated at the end of the tip portion 21 has a diameter that allows an end portion 33 of a grease gun hose (connecting tube) 30 to be inserted and attached, which will be later described. In the through hole 23, a threaded portion 23b is formed on the inner peripheral surface of the opening at the end of the tip portion 21. The threaded portion 23b corresponds to a male screw 33n formed on the grease gun hose 30. That is, the pitch, the nominal diameter, the root diameter, the effective diameter, the angle of the screw thread, etc. are set such that the threaded portion 23b and the male screw 33n are engaged to each other to seal the grease gun hose 30 and the through hole 23.

Either one of the threaded portion 23a and the threaded portion 23b may be a reversed thread. In this embodiment, the threaded portion 23a may be a left-hand thread. In this way, when the male thread 33n of the end portion 33 of the grease gun hose 30 and the male thread in of the spout 1g of the pouch container 1 are fastened and connected to the connecting member 20, it is possible to prevent the threaded portion from coming off from the other threaded portion. Alternatively, both the threaded portion 23a and the threaded portion 23b may not be reversed threads.

The connecting member 20 in which the through hole 23 is formed is a member different from the cylindrical portion 1j of the spout 1g of the pouch container 1. The through hole 23 has the opening connected to the inside of the cylinder 11 and the opening provided at the end of the tip portion 21. The connecting member 20 in which the through hole 23 is formed connects the cylindrical portion 1j of the spout 1g of the pouch container 1 and the end portion 33 of the grease gun hose 30. Thus, the portion forming the opening connected to the inside of the cylinder 11 and the portion forming the opening provided at the end of the tip portion 21 have different diameters from each other. The portion forming the opening connected to the inside of the cylinder 11 is connected to the cylindrical portion 1j of the spout 1g of the pouch container 1. The portion forming the opening provided at the end of the tip portion 21 is connected to the end portion 33 of the grease gun hose 30. Accordingly the diameter of the through hole 23 changes in the axial direction of the connecting member 20. Specifically, a stepped portion 23c is formed that reduces the diameter from the opening connected to the inside of the cylinder 11 to the opening provided at the end of the tip portion 21. Alternatively it is also possible to form a diameter-reduced portion whose inner surface is inclined along the axial direction without forming the step portion 23c.

A surface 22c of the flange portion 22 that faces the outside of the tip portion 21 in the axial direction (facing the end of the tip portion 21) contacts a surface 12c. The surface 12c of the through hole 12a in the lid 12 faces the inside of the cylinder 11. In this manner, the surface 22c of the flange portion 22 contacts the surface 12c of the lid body 12. The connecting member 20 can be set in the lid body 12 by inserting the tip portion 21 through the through hole 12a.

A stepped portion 21d is provided on the outer peripheral surface of the tip portion 21. The outer edge of the tip portion 21 is smaller in diameter than the outer edge of the surface 22c. In the step portion 21d, a flat portion 21e is formed at a position abutting the through hole 12a of the lid 12. Two flat portions 21e are provided symmetrically with respect to the axis of the connecting member 20. The flat portion 21e is disposed in parallel with the axis of the connecting member 20. The two flat portions 21e are formed to be parallel to each other. The flat portion 21e is formed such that a part of the tip portion 21 corresponding to the flat portion 21e is reduced in diameter relative to a tip end part of the tip portion 21 situated closer to the tip end than the flat portion 21e. The length of the flat portion 21e in the direction along the axis of the connecting member 20 is set such that the flat portion 21e can be held by a jig.

On the inner circumferential surface of the through hole 12a of the lid 12, a flat portion 12e corresponding to the flat portion 21e is provided. Two flat portions 12e are formed at the symmetrical positions with respect to the axis of the through hole 12a. The flat portions 12e are provided parallel to the axis of the through hole 12a. The two flat portions 12e are disposed parallel to each other. The flat portion 12e is formed such that the corresponding portion of the flat portion 12e is reduced in diameter relative to the inner circumference of the through hole 12a.

Figure 7:
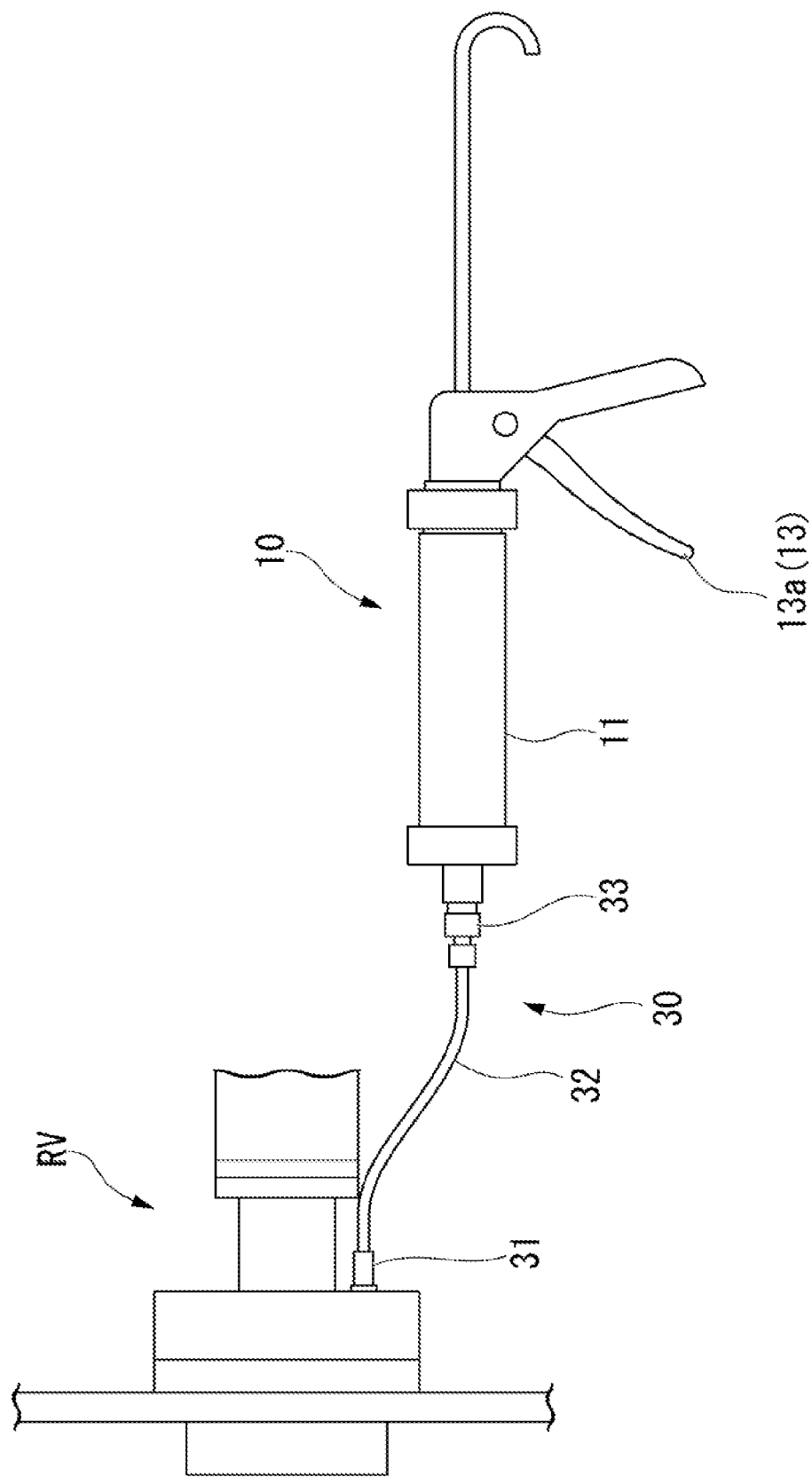
FIG. 7 schematically illustrates the grease gun being used according to the embodiment.

FIG. 7 schematically illustrates the grease gun being used according to the embodiment. When the grease gun 10 in the embodiment is used, the grease gun hose 30 is used as shown in FIG. 7. A lubricant composition (grease) is filled through the grease gun hose 30. Thus, the grease gun hose 30 has an end portion 31 that is to be connected to an inlet of an eccentric oscillating-type planetary gear speed reducer RV and an end portion 33 that is to be connected to the spout 1g of the pouch container 1 via the connecting member 20.

The end portion 31 has a shape connectible to the inlet of the reducer RV to supply the lubricant composition (grease) to the reducer RV, for example, the end portion 31 can be a grease nipple or the like. The shape of the end portion 31 is not particularly limited as long as it corresponds to the inlet of the speed reducer RV. A male thread 33n is formed on the end portion 33. The male screw 33n corresponds to the threaded portion 23b formed on the inner circumferential surface of the opening of the through hole 23 at the end of the tip portion 21 that protrudes from the lid 12.

The grease gun hose 30 is formed such that its inner diameter and length have predetermined dimensions. Specifically, the dimensions of the grease gun hose are determined depending on parameters of the grease gun 10 such as a pumping pressure such that the condition of the grease to be injected into the reducer RV satisfies a predetermined condition. In particular, the relational expression of the pumpability is expressed as follows.

$$\eta = KP\pi D^4/(Lv/t)$$

η: Apparent viscosity (depending on the worked penetration of the grease, the kinematic viscosity of the base oil, and the proportion of the base oil)

P: Pumping pressure

D: Pipe inner diameter

L: Pipe length v/t: Flow rate

K: constant

When using the grease gun 10, the lid 12 is removed from the cylinder 11. The spout 1g of the pouch container 1 serving as a cartridge is connected to the inner opening of the through hole 23 in the connecting member 20. At this time, the male thread in and the threaded portion 23a are engaged to fasten and seal. At this time, the tip portion 21 of the connecting member 20 may be inserted in the through hole 12a of the lid 12, or the connecting member 20 may be separated from the lid 12.

Subsequently, the connecting member 20 to which the spout 1g of the pouch container 1 has been connected is brought into a state in which the tip portion 21 penetrates the lid 12 in the through hole 12a. Alternatively the connecting member may be in advance in the state in which the tip portion 21 penetrates the lid 12 in the through hole 12a.

Subsequently, the spout 1g of the pouch container 1 is inserted into the cylinder 11 such that the spout 1g faces the threaded portion 23a of the connection member 20 which penetrates the lid 12. Then, the male thread 1n on the outer peripheral surface of the cylindrical portion 1j of the spout 1g and the threaded portion 23a are fastened. The pouch container 1 serves as the cartridge. The lid 12 is attached to the tip of the cylinder 11 by engaging the threaded portion 11b of the cylinder 11 with the threaded portion 12b of the lid 12 to seal the inside of the cylinder 11. At this time, the surface 22c of the flange portion 22 and the surface 12c of the lid 12 contact each other, and the tip portion 21 is passed through in the through hole 12a. In this way, the connection member 20 is set in a predetermined position of the lid body 12.

In this state, the pouch container 1 is opened by opening the open facilitating portion 1p of the spout 1g. At the same time, the end portion 33 of the grease gun hose 30 is connected to the opening of the through hole 23 of the connecting member 20 that partly projects from the lid 12. At this time, the threaded portion 23b and the male thread 33n are fastened to each other. In this way, the grease gun hose 30 and the through hole 23 are sealed. Further, the end portion 31 of the grease gun hose 30 is connected to the inlet of the eccentric oscillating-type planetary gear reducer RV.

In this state, by operating the trigger mechanism (push member) 13, the piston 14 is moved to approach the lid 12. The piston 14 presses the bottom of the pouch container 1 to push out the lubricant composition (grease) filled in the pouch container on predetermined conditions. The lubricant composition (grease) flowing through the grease gun hose 30 is injected into the speed reducer RV from the inlet at a predetermined flow rate and pressure. The above steps may be performed in a different order from the order described above.

With the grease gun 10 according to the embodiment, it is possible to replace the grease filled in the speed reducer RV without leak of the lubricant composition (grease) from the connecting member 20 and by pressing out the grease from the grease gun 10 at a predetermined flow rate and pressure. With the grease gun 10 according to the embodiment, it is possible to improve the product life of the speed reducer RV at high temperatures and prevent an increase in input torque at low temperatures. Further, with the grease gun 10 according to the embodiment, it is possible to prevent seeping of the lubricant composition that can increase the starting efficiency of the speed reducer RV, and it is possible to divide the lubricant composition into small packages. Therefore, by using the pouch container 1 that can easily and inexpensively store the lubricant composition (grease) for a long period of time, the grease gun 10 according to the embodiment is able to easily perform injection of the grease into the speed reducer RV. When the grease filled in the speed reducer RV is replaced, the grease gun 10 can be easily connected to the speed reducer RV without transferring the grease to another container. Consequently it is possible to prevent leakage of the lubricant composition (grease) from the connecting member. As discussed above, with the grease gun 10 according to the embodiment, the process of the connecting work and the injection work can be simplified, and the work time of replacing the grease in the speed reducer can be reduced.

The conditions of pumping the lubricant composition (grease) in this embodiment are as follows:

the grip force for the trigger 13a of the grease gun 10 is 50 gfk, the lever ratio is 1:12, and the inner diameter is 53 mm;

the pumping pressure with the grease gun hose is 30: 3 MPa or less;

the inner diameter of the grease gun hose 30 is 2.5-20 mm;

the length of the grease gun hose 30 is 1000 mm or less;

the delivery flow rate is 1 to 7 $cm^3/s$;

the worked penetration of the grease is 300-450;

the kinematic viscosity of the grease base oil is 20 to 150 $mm^2/s$ (40° C.); and the proportion of the base oil in the grease: 50 to 99% by weight.

What is claimed is:

1. A grease gun, comprising:
a cylindrical member configured to accommodate a container that includes a pouch formed of a film material and a spout fixed to the pouch, a lubricant composition being filled and sealed in the pouch;
a push member configured to press the container in the cylindrical member to push out the lubricant composition;
a connecting member configured to connect the spout a connecting tube connected to a subject to which the lubricant composition is supplied; and
a lid having a through hole, and configured to threadedly couple to an outer peripheral surface of an end portion of the cylindrical member,
wherein the connecting member having a through-hole through which the lubricant composition passes from the container to the subject,
a first threaded portion is formed on an inner peripheral surface of one opening of the through-hole to be connected to the spout,
a second threaded portion is formed on an inner peripheral surface of the other opening of the through-hole to be connected to the connecting tube,
wherein the connecting member is connected to the spout via the first threaded portion, inside the lid,
wherein the connecting member further comprises:
a tip portion configured to insert in the through hole of the lid; and
a flange portion configured to place inside the lid, and to abut on a circumferential edge of the through hole of the lid,
wherein a portion of the flange portion is placed inside the end portion of the cylindrical member, wherein the lid having a first surface facing inside of the cylindrical member, wherein the flange portion having a second surface to be in contacted with the first surface, wherein the lid configured to threadedly couple to the outer peripheral surface of the end portion of the cylindrical member with the first surface in contact with the end of the cylindrical member, and wherein the lid and the connecting member are positioned by contacting the first surface and the second surface with each other.

2. The grease gun of claim 1, wherein a flow rate of the lubricant composition pushed out is 1 to 7 cm$^3$/s.

3. The grease gun of claim 1, wherein a pumping pressure to push out the lubricant composition is 3 MPa or less.

4. The grease gun of claim 1, wherein a connecting tube connected to the grease gun has an inner diameter of 2.5 to 20 mm and a length of 1000 mm or less.

5. The grease gun of claim 1, wherein a first flat portion is formed on an outer peripheral surface of the tip portion, wherein a second flat portion corresponding to the first flat portion is formed on an inner peripheral surface of the through hole of the lid.

\* \* \* \* \*